(12) United States Patent
Nguyen et al.

(10) Patent No.: US 6,266,202 B1
(45) Date of Patent: Jul. 24, 2001

(54) CLOSED LOOP WRITE VERIFICATION IN A DISC DRIVE

(75) Inventors: Hieu V. Nguyen; Housan Dakroub, both of Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/326,070

(22) Filed: Jun. 4, 1999

Related U.S. Application Data
(60) Provisional application No. 60/088,169, filed on Jun. 5, 1998.
(51) Int. Cl.[7] .............................. G11B 5/09; G11B 27/36
(52) U.S. Cl. ................................. 360/53; 360/31; 360/46
(58) Field of Search .................................. 360/31, 46, 53

(56) References Cited

U.S. PATENT DOCUMENTS

| | | |
|---|---|---|
| 3,810,236 | 5/1974 | Horowitz et al. . |
| 4,599,717 | 7/1986 | Bracht et al. . |
| 5,255,270 | 10/1993 | Yanai et al. . |
| 5,289,478 | 2/1994 | Barlow et al. . |
| 5,422,760 | 6/1995 | Abbott et al. . |
| 5,471,351 | 11/1995 | Ishiguro . |
| 5,475,665 | 12/1995 | Tani et al. . |
| 5,532,992 | 7/1996 | Funamoto . |
| 5,717,673 | 2/1998 | Ohkubo . |
| 6,111,708 | * 8/2000 | Jewell et al. ............................ 360/31 |

\* cited by examiner

*Primary Examiner*—Regina Y. Neal
(74) *Attorney, Agent, or Firm*—Crowe & Dunlevy (57) ABSTRACT

An apparatus and method for performing real-time, closed loop write verification in a disc drive having a rotatable magnetic disc and a head having read and write elements. During a write operation, the disc drive generates a write current signal indicative of input data to be written to the disc. The write current signal is applied to the write element, which generates a time-varying magnetic field to simultaneously induce a readback signal in the read element through magnetic coupling of the read element to the write element, and to magnetize the disc to write the input data to the disc. The readback signal induced in the read element is used to reconstruct a set of output data which is used to verify accuracy of the input data.

12 Claims, 6 Drawing Sheets

CLOSED LOOP WRITE VERIFICATION IN A DISC DRIVE

RELATED APPLICATIONS

This application claims priority to U.S. Provisional Application No. 60/088,169 filed Jun. 5, 1998.

FIELD OF THE INVENTION

The present invention relates generally to the field of disc drive devices and more particularly, but without limitation, to performing real-time, closed loop write verification through magnetic coupling of read and write elements of a disc drive head.

BACKGROUND OF THE INVENTION

Disc drives are used as primary data storage devices in modern computers and computer networks. A typical disc drive includes a head-disc assembly (HDA) housing one or more magnetic discs which are rotated by a spindle motor at a constant high speed and accessed by an array of read/write heads which store data on tracks defined on the disc surfaces. Electronics used to control the operation of the HDA are provided on a printed wiring assembly ("circuit board") which is mounted to the underside of the HDA.

Each head is typically provided with separate read and write elements, with a common configuration utilizing a thin film, inductive write element and a magneto-resistive (MR) read element. Data are written by passing a write current through the write element, with the write current generating a time-varying magnetic field which selectively magnetizes the disc surface. Previously written data are read using the read element to transduce the selective magnetization of the disc to generate a readback signal which is used by a read channel to reconstruct the data. An interface circuit buffers and controls the transfer of data between the disc and a host computer.

Technological advancements in the art have resulted in continued improvements in disc drive data storage capacities and transfer rates. It has not been at all uncommon for each successive generation of drives to provide substantially twice the data storage capacity as the previous generation, at an equal or improved data transfer rate. Design cycle times are also being shrunk to the point that a new generation of drives is typically introduced into the marketplace every few months.

The commercial success of disc drives is not only a result of the costeffective manner in which vast amounts of user data can be stored and retrieved, but also in the demonstrated reliability of the typical disc drive over a relatively long operational life. Nevertheless, for applications where data integrity is critical, methodologies have been developed to further enhance the ability of disc drives to consistently and accurately store and retrieve data.

One such methodology is the grouping of a plurality of drives into a multi-drive array, sometimes referred to as a RAID ("Redundant Array of Inexpensive Discs"). Since their introduction, RAIDs have found widespread use in a variety of applications requiring significant levels of data transfer, capacity and integrity performance. Various RAID architectures employ mirroring (simultaneously writing data to two or more identical drives), striping (writing portions of the data across multiple drives) and interleaving (employing various types of error detection and correction schemes at multiple levels to ensure data integrity).

Another particularly useful methodology to maximize data integrity is through the use of write verification, which involves the writing of data to a disc followed by a subsequent read operation where the previously stored data are retrieved from the disc to ensure the data were correctly written. However, such write verification operations undesirably decrease the data transfer performance of the disc drive, as each write operation requires each sector to which data are written to be accessed at least twice: first, when the data are written, and second, when the data are subsequently read back for verification. Conventional write verification techniques accordingly impose a severe penalty on disc drive performance, limiting data transfer rates to levels substantially below that which would be otherwise achievable.

As consumer demands continue to drive further advances in data transfer rate and integrity performance, there remains a continual need for improvements in the disc drive art whereby these often mutually exclusive characteristics can be optimized. It is to such improvements that the present invention is directed.

SUMMARY OF THE INVENTION

The present invention provides an apparatus and method for performing closed-loop, real time write verification in a disc drive.

In accordance with a preferred embodiment, the disc drive has a rotatable magnetic disc, and a head with read and write elements with the read element being magnetically coupled to the write element.

Data are written to the disc by first generating a write current signal indicative of the data to be written and then applying the write current signal to the write element. In response, the write element generates a time-varying magnetic field which magnetizes the disc to write the data to the disc, while simultaneously inducing a readback signal in the read element as a result of the magnetic coupling of the read element to the write element. The readback signal is used to verify the accuracy of the writing operation.

More particularly, a set of output data is reconstructed from the readback signal and compared to the data originally written to the disc. In this manner, the data written to the disc can be verified on-the-fly, eliminating the need for a subsequent read operation to verify the data.

The write verification can be performed during substantially all write operations, or on a sampled basis as a diagnostic tool or error recovery routine. One read channel configuration includes the use of a single partial response, maximum likelihood (PRML) data path that switches between two different sets of channel parameters, with one set used during normal readback operations and the other set used during on-the-fly write verification. An alternative read channel configuration employs a PRML data path for normal readback operations in parallel with a peak-detect data path used for write verification detection.

These and various features as well as advantages which characterize the present invention will be apparent from a reading of the following detailed description and a review of the associated drawings.

BRIEF DESCRIPTION OF THE DRAWINGS

FIG. 6 is a functional block diagram of the control electronics of the disc drive of FIG. 1.

FIG. 8 provides graphical representations of write current, normal readback and magnetically-coupled readback signal curves.

FIG. 9 illustrates one preferred read channel configuration which employs a partial response, maximum likelihood (PRML) data path for normal readback operations in parallel with a peak-detect data path used for on-the-fly write verification detection operations.

DETAILED DESCRIPTION

Figure 1:
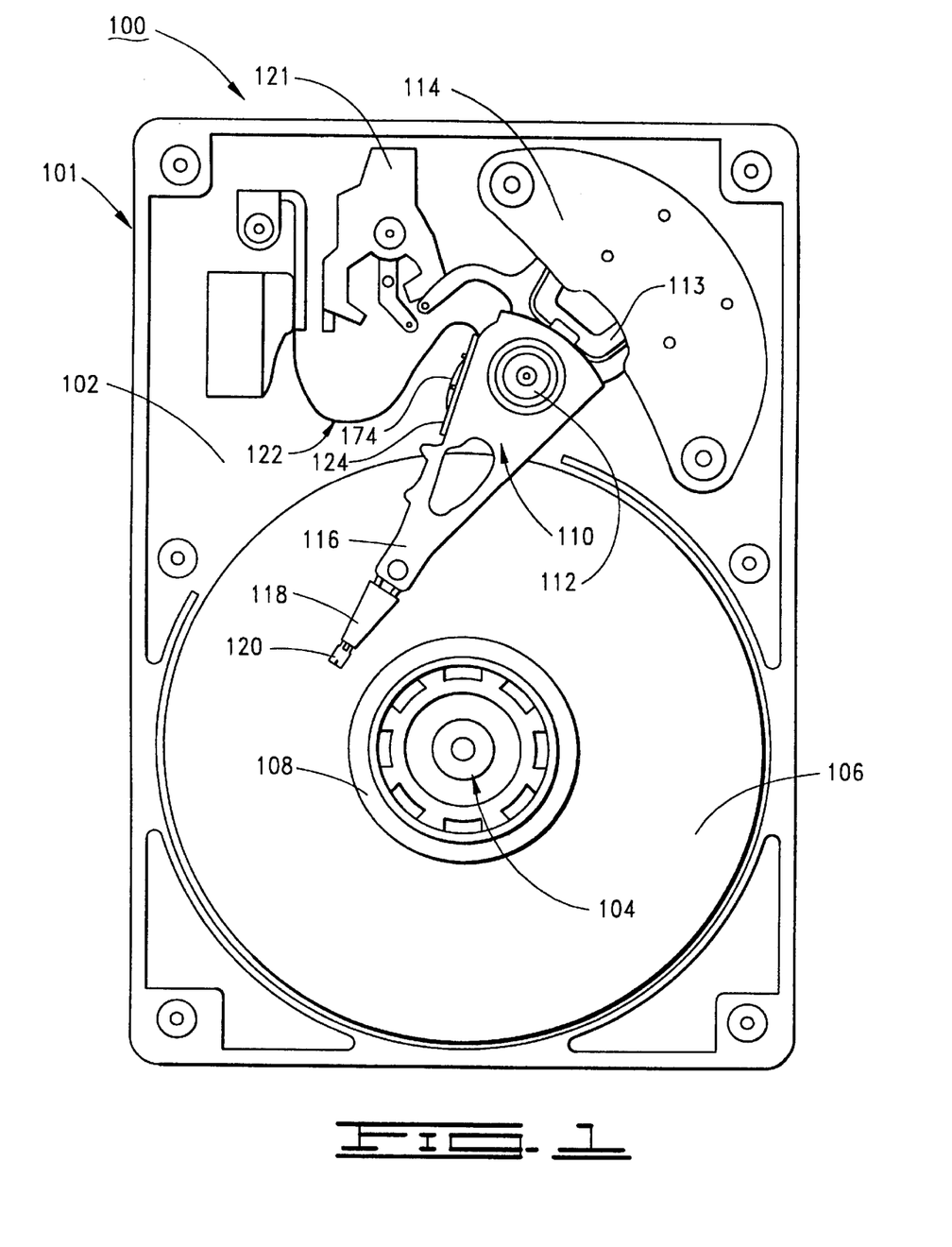
FIG. 1 provides a top plan view of a disc drive constructed in accordance with preferred embodiments of the present invention.

The present discussion will now turn to a detailed description of various preferred embodiments of the claimed invention. Referring first to FIG. 1, shown therein is a top plan view of a disc drive 100 used to store and retrieve computerized data.

The disc drive 100 includes a head-disc assembly (HDA) 101 and a disc drive printed wiring assembly (PWA) which is mounted to the underside of the HDA 101 and thus, not visible in FIG. 1. As discussed below, the PWA provides circuitry necessary to control the operation of the HDA 101 and to transfer data between the HDA 101 and a host computer in which the disc drive 100 can be mounted in a user environment.

The HDA 101 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs 106 at a constant high speed, with a disc clamp 108 securing the discs to the spindle motor 104.

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms from which corresponding flexure assemblies extend, the topmost of which are identified at 116 and 118, respectively. Heads 120 are provided at distal ends of the flexure assemblies 116, 118 and are supported over the discs 106 by air bearings established by air currents set up by the rotation of the discs 106.

A latch assembly 122 is provided to secure the heads 120 over texturized landing zones (indicated by broken line 123) at the innermost diameters of the discs 106 when the disc drive 100 is deactivated. A flex circuit assembly 124 provides electrical communication paths between the actuator assembly 110 and the disc drive PWA.

Figure 2:
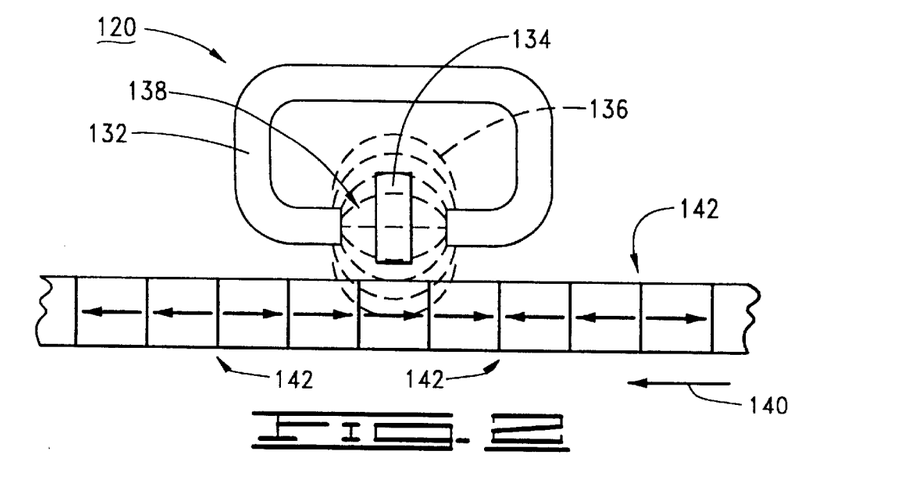
FIG. 2 is an generalized representation of the construction and operation of read and write elements of a selected head of the disc drive of FIG. 1.

Referring to FIG. 2, each of the heads 120 includes a thin-film inductive write element 132 and a magneto-resistive (MR) read element 134. The write element 132 writes data to the corresponding disc 106 by generating a timevarying magnetic field (indicated generally at 136) across a gap 138 in response to write currents applied to the write element 132. The magnetic field 136 operates to selectively magnetize the disc 106 along a direction of movement of the disc 106 (as indicated by arrow 140). Magnetic flux transitions result at locations where reversals in the magnetization of the disc occur, such as shown at 142.

The read element 134, preferably disposed in the write gap 138 of the write element 132, is characterized as providing a changed electrical resistance in the presence of a magnetic field of selected orientation. Hence, by passing a bias current through the read element 134, previously stored data can be transduced from the magnetized disc surface and converted to a readback signal in relation to changes in the voltage across the read element. As discussed below, the disc drive 100 further operates to perform real-time, closed loop write verification by using the read element 134 to detect the time-varying magnetic field 136 from the write element 132 during a write operation.

Figure 3:
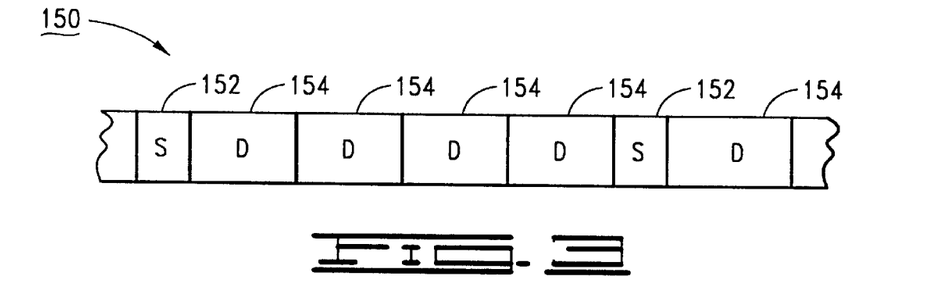
FIG. 3 illustrates the general manner in which data are stored on each disc of the disc drive of FIG. 1.

At this point, however, it will be useful to briefly discuss the general manner in which data are arranged on the tracks. FIG. 3 shows a portion of a track 150 on a selected disc 106, with each track including a number of periodically disposed servo blocks 152 which are written to the discs during manufacturing. The servo blocks are used to control the radial position of the heads and are radially aligned to extend from an innermost radius to an outermost radius of the disc, much like spokes of a wheel. Between each successive pair of servo blocks are a number of data blocks 154 (sectors), which are used to store user data and are generated during a disc drive formatting operation. The general formats of the servo blocks 152 and the data blocks 154 are set forth by FIGS. 4 and 5.

Figure 4:
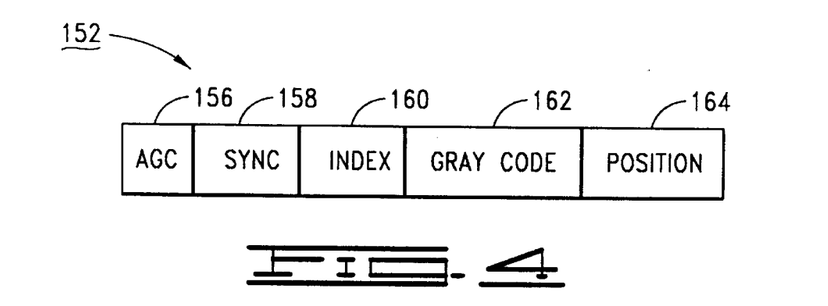
FIG. 4 provides a representation of the format of each servo field of FIG. 3.

As shown in FIG. 4, an automatic gain control (AGC) field 156 stores an oscillating pattern (such as a 2T pattern) to prepare servo control circuitry (not shown in FIG. 4) of the disc drive for receipt of remaining portions of the servo field 152. A synchronization (sync) field 158 provides timing information to the servo control circuitry. Index and Gray code fields 160, 162 respectively, indicate angular and radial position of the servo field 152. A position field 164 provides inter-track positioning information.

Figure 5:
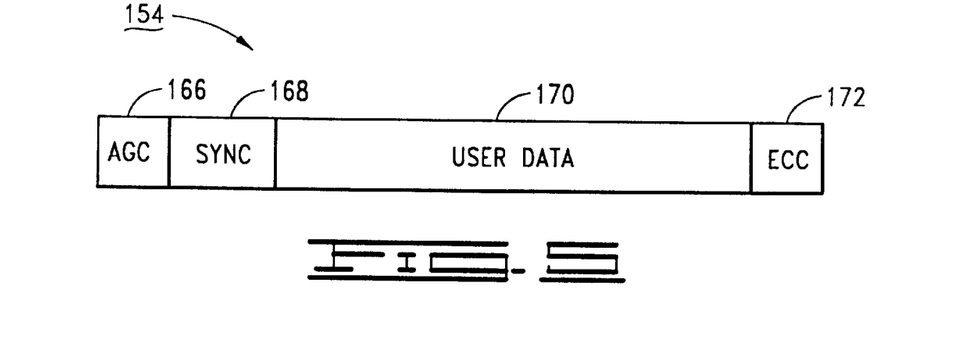
FIG. 5 provides a representation of the format of each data field of FIG. 3.

FIG. 5 shows AGC and sync fields 166, 168 respectively, which prepare read channel circuitry (not shown in FIG. 5) for receipt of user data which are stored in a user data field 170. Error correction code (ECC) words, appended to the user data to facilitate error detection and correction, are stored in ECC field 172.

FIG. 6 provides a generalized functional block diagram of the control electronics arranged on the aforementioned disc drive PWA in accordance with preferred embodiments of the present invention. It will be noted that arrowed paths are provided between respective functional blocks to indicate the general interconnection thereof.

A selected head is denoted at 120, with corresponding write and read elements 132, 134. It is contemplated that the write and read elements 132 and 134 are magnetically coupled, as shown; that is, the head is constructed so that the read element 134 is subjected to the time-varying magnetic field 136 generated by the write element 132 during a write operation. While the placement of the read element 134 within the gap 138 of the write element 132 (as shown in FIG. 2) represents one preferred construction, such placement is not necessarily required to achieve the desired operation of the disc drive 100.

Continuing with FIG. 6, a preamplifier/driver circuit ("preamp/driver") is set forth at 174 and includes a write driver 176 and a read preamp 178, with the write driver 176 applying write currents to the write element 132 and the read preamp 178 applying a read bias current to the read element 134. Additional circuitry, such as head selection logic and a bias current source, have been omitted from FIG. 6 for purposes of clarity. For reference, the preamp/driver 174 is preferably mounted to the actuator assembly 110 within the confines of the HDA 101 (FIG. 1), to minimize the physical distance separating the head 120 and the preamp/driver 174.

A communication channel 180 is operably coupled to the preamp/driver 174, and includes a write channel 182 which encodes and serializes input user data for writing by the write driver 176, and a read channel 186 which receives readback signals from the read preamp 178 and reconstructs previously stored user data therefrom. It will be noted that alternative preferred constructions for the read channel 186 will be discussed below.

Continuing with FIG. 6, data from the servo blocks (152, FIGS. 3 and 4) are passed from the read channel 184 to a servo circuit 186, which includes a programmable digital signal processor (DSP) 187 to carry out head positioning operations. An interface circuit 188 has a buffer 190 to temporarily store data during data transfer operations between the discs 106 and a host computer (not shown). The storage capacity of the buffer 190 preferably comprises several megabytes (MB). Transfers between the buffer 190 and discs 106 are controlled by a disc interface 192, and transfers between the buffer 190 and the host computer are controlled by a host interface 194. A processor interface 196 enables communication between the interface circuit 188 and a system processor 198, which controls overall operation of the disc drive 100. For a more detailed discussion of the construction and operation of a typical interface circuit, see U.S. Pat. No. 5,262,662 issued to Shaver et al., assigned to the assignee of the present invention.

Figure 7:
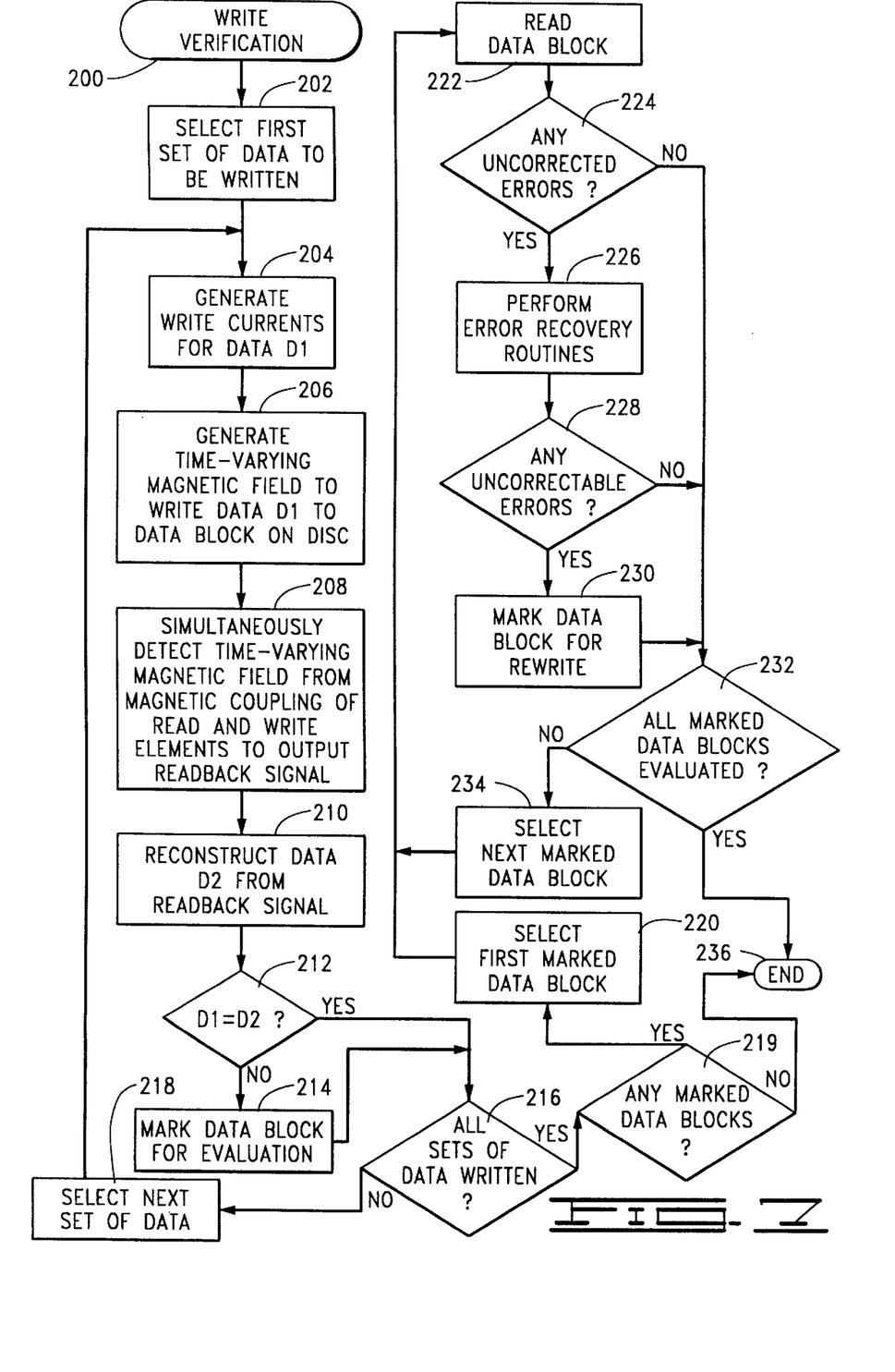
FIG. 7 is a WRITE VERIFICATION routine, illustrative of steps preferably carried out by the disc drive of FIG. 1 to perform closed-loop write verification in accordance with a preferred embodiment of the present invention.

FIG. 7 provides a flow chart for a WRITE VERIFICATION routine 200, illustrative of steps carried out by the disc drive 100 in accordance with a preferred embodiment to perform closed-loop write verification of data written to the discs 106. During a write operation, the first set of data to be written is selected, as shown by step 202. While the amount of data in the first set of data can vary depending on the application, preferably the first set of data represents an amount that can be accommodated by the user data field 170 of a selected data block 154 (FIG. 5), such as 512 kilobytes (kB). Of course, a large user file is typically broken down and written to a number of data blocks 154, with the file being transferred to the buffer 190 and incrementally outputted to the write channel 182.

The write channel 182 operates to encode and serialize the data (denoted as "D1") to enable the write driver 176 to generate write currents indicative of the data D1, as shown by step 204. This operation includes run-length limited (RLL) and error correction code (ECC) encoding, to facilitate subsequent retrieval of the recorded data.

The write currents generated at step 204 are applied to the write element 132 to generate the time-varying magnetic field necessary to write the data D1 to the corresponding data field 154, step 206. Simultaneously, as shown by step 208, the read element 134 detects the time-varying magnetic field from the write element 132, due to the magnetic coupling between the read element 134 and the write element 132, and outputs a readback signal in response thereto.

It will be noted that the readback signal is generated in response to the magnetic field from the write element 132 and not from the selective magnetization of the disc 106. In this regard, the read element 134 "senses" the operation of the write element 132 in real time, unlike conventional write verification schemes where the read element 134 subsequently transduces previously written data from the disc 106. To achieve this real time sensing, a read bias current is applied to the MR read element 134 during the writing of data by the write element 132.

After preamplification by the read preamp 178, the readback signal is reconstructed by the read channel to generate a set of readback data ("D2"), as indicated by step 210. A comparison between the readback data D2 and the written data D1 is next performed at decision step 212. This comparison can be achieved in a number of ways. In one preferred embodiment, a direct comparison is made. More particularly, the initially written set of data (D1) is retained in a portion of the buffer 190, so that once the reconstructed set of data (D2) is recovered to the buffer 190, the two sets of data can be compared.

In another preferred embodiment, error correction codes (ECC) can be employed in the reconstructed set of data to determine whether any errors are detected in the reconstructed data D2. It will be noted that the use of ECC allows different levels of data integrity assurance, in that ECC allows detection and correction up to a selected number of errors in the readback data. Hence, the acceptability of a write verification operation (i.e., the operation of decision step 212) can be based on the ability of the disc drive 100 to recover the data D2, regardless of the number of erroneous bytes of data detected and then corrected by ECC; alternatively, although the disc drive 100 successfully recovers all of the data D2, in particularly critical data integrity applications an excessive number of detected errors might result in the data being further evaluated for a possible rewriting operation.

Continuing with FIG. 7, when the recovered data D2 does not match the written data D1 (or is otherwise deemed sufficiently marginal), the associated data block 154 is marked for subsequent evaluation, step 214. Such marking is typically achieved using a status register which indicates the status of the various data blocks of the disc drive 100. The routine next determines whether additional sets of data remain to be written, decision step 216; if so, the next set of data is selected at step 218 and the routine returns as shown.

When all of the data have been written, the routine continues to decision step 218, which determines whether any of the accessed data blocks have been marked for further evaluation. If so, the first such marked data block is selected at step 220 and a conventional read verification operation is performed, step 222. That is, the read element 134 is positioned over the associated data block to transduce the selective magnetization of the user data field 170 (and ECC field 172) to generate a readback signal which is presented to the read channel 184 for reconstruction. If any uncorrected errors are detected in the recovered data, decision step 224, error recovery routines are applied at step 226 in an attempt to recover the data. Such routines can involve adjustment of various read channel and preamp/driver parameters, application of a position offset to move the read element 134 away a selected distance from the center of the track, etc. A general discussion of such routines is provided in U.S. Pat. No. 5,721,816 issued to Kusbel et al., assigned to the assignee of the present invention.

Continuing with the routine of FIG. 7, a determination is next made whether the operation of step 226 was successful (i.e., whether uncorrectable errors remain), as indicated by decision step 228. If so, the data block is marked for a rewrite operation at step 230. The routine continues to decision step 232 to determine whether additional data blocks have been marked for evaluation; if so, the next marked data block is selected at step 234 and the routine continues as shown. Finally, the routine ends at step 236.

It will be noted that various alternatives can be readily implemented based on the flow of FIG. 7. For example, for purposes of enhancing data integrity it may be desirable to rewrite data blocks that exhibit uncorrected errors (step 224), regardless whether the disc drive 100 can subsequently recover such errors during step 226. Maintaining the data to be written in the buffer 190 during the entire operation of the routine would facilitate efficient rewriting of any deficient data blocks. Successfully performing the routine for all of the data blocks on a single track before moving to a different track would also result in certain efficiencies of operation.

It will further be noted that, although the foregoing discussion generally contemplates full-time simultaneous write verification, the write verification routine of FIG. 7 can also be performed on a sampled basis, depending upon the requirements of the user. For example, the routine can be implemented as part of an error recovery routine, so that the routine is performed in response to an error detected during a conventional write operation. Because the write verification presented above advantageously operates to detect a failed electrical interconnection path between the preamp/driver 174, the routine can also be used as a self-diagnostic routine periodically performed at appropriate times during drive operation, such as during idle times when the discs 106 are still spinning, but no host commands are being serviced.

Various alternative configurations for the read channel 184 will now be discussed with reference to FIGS. 8–10. FIG. 8 shows graphical representations of a write current signal curve 240, a normal readback signal curve 242 and a coupled readback signal curve 244, each being plotted against a common x-axis 246 indicative of elapsed time and a common y-axis 248 indicative of respective signal amplitudes.

The write current signal curve 240 provides a general representation of pulsed write currents that are applied by the write driver 176 (FIG. 6) to the write element 132 (FIGS. 2, 6) to selectively magnetize the associated disc 106. As discussed above, transitions in current polarity (indicated at 250) in the write current signal curve 240 generate the magnetic flux transitions 142 on the disc surface (FIG. 2).

The normal readback signal curve 242 is generally indicative of the readback signal generated during a conventional read operation as the MR read element 134 transduces the flux transitions 142 from the disc surface. The characteristics of a given normal readback signal such as 242 will depend on a number of factors, including the construction of the drive, the presence of electrical noise, the position of the head, etc. Hence, the curve 242 has been presented to generally illustrate a typical readback response, with positive and negative amplitude peaks 252 resulting from the detection of the flux transitions 142 on the disc surface.

The coupled readback signal curve 244 generally represents the readback signal that is induced in the MR read element 134 as a result of the magnetic-coupling between the write element 132 with the read element 134, as discussed above. For clarity, it will be noted that the coupled readback signal curve 244 and the normal readback signal curve 242 are not generated at the same time; that is, the coupled curve 244 is generated simultaneously during a write operation as the write current signal 240 is being applied to the write element 132, whereas the normal curve 242 is generated later during a subsequent, conventional read operation at a time when no write current is applied to the write element 132.

The coupled readback signal curve 244 has positive and negative peaks 254 which are generated in response to the transitions 250 of the write current signal curve 240. The peaks 254 are generally better defined than the peaks 252, due to the relatively large energy content of the write current signal curve 240 necessary to realign the magnetic orientation of the disc surface to store data. It is contemplated that the amplitudes of the peaks 254 will typically be substantially greater than the amplitudes of the peaks 252, although this is not reflected in FIG. 8, as the amplitudes of the curves 240, 242 and 244 have been normalized for ease of illustration.

With this review of the general differences between normal readback signals and coupled readback signals that will typically occur, reference is now made to FIG. 9 which illustrates one preferred configuration for the read channel 184 of FIG. 6. More particularly, FIG. 9 employs a partial response, maximum likelihood (PRML) data path 260 in parallel with a peak-detect write verify data path 262.

The PRML data path 260 is configured to receive the normal readback signal curve 242 (FIG. 8) and use PRML signal processing techniques to reconstruct the user data therefrom in a conventional manner. The peak-detect data path 262 is configured to receive the coupled readback signal curve 244 (FIG. 8) and to use appropriate threshold levels to detect the peaks 254 in order to reconstruct the write verify data set from the write current signal curve 240. An advantage of the configuration of the circuit of FIG. 9 is the relative ease in which a conventional peak-detection circuit can be incorporated into an existing PRML signal processing integrated circuit and utilized as desired while minimizing disturbance to the configuration of the PRML readback path.

Figure 10:
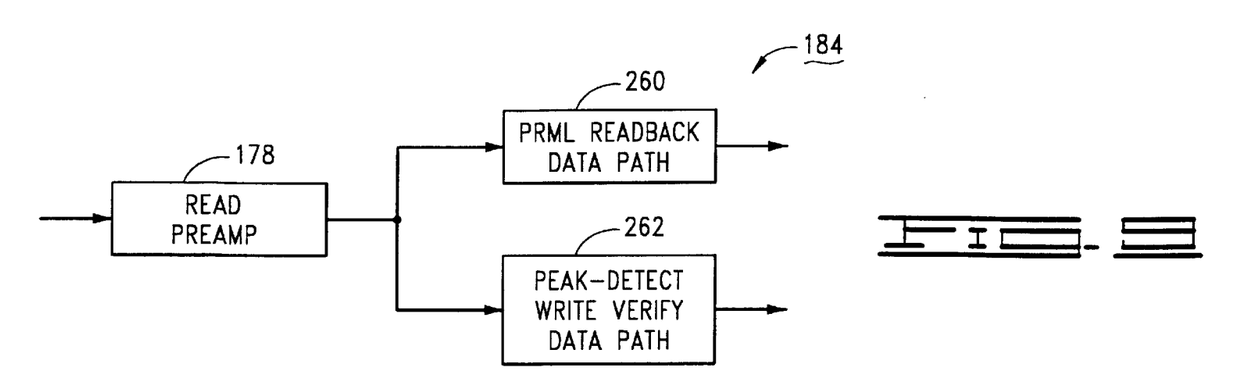
FIG. 10 illustrates an alternative read channel configuration which includes the use of a single PRML data path that switches between two different sets of channel parameters, with one set used during normal readback operations and the other set used during on-the-fly write verification detection operations.
Figure 11:
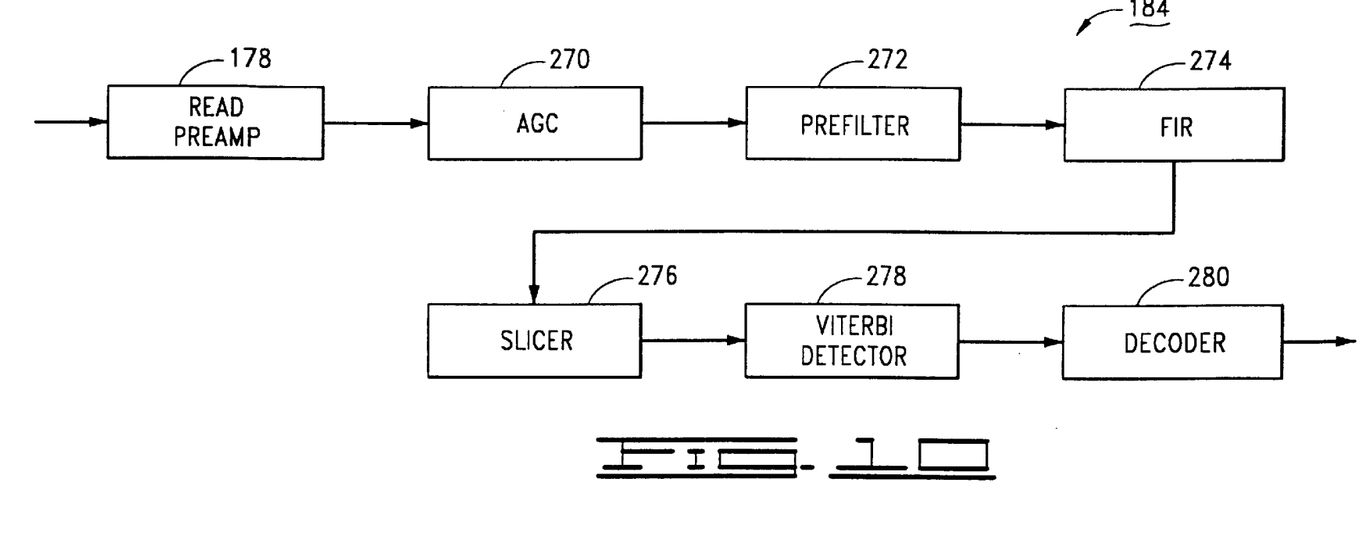

An alternative configuration for the read channel 184 is set forth by FIG. 10, which employs a single PRML data path that is used for both normal readback operations and on-the-fly write verification detection operations. PRML channel constructions are well known and can take a number of forms, such as exemplified in U.S. Pat. No. 5,422,760 issued to Abbott et al. Nevertheless, to facilitate the present discussion, a brief overview of selected portions of the PRML data path will be presented.

The PRML data path set illustrated in FIG. 10 includes an automatic gain control (AGC) block 270 which applies variable gain amplification to normalize the peak-to-peak signal amplitude of the input readback signals from the read preamp 178. An adaptive prefilter 272 provides frequency domain filtering. A finite impulse response (FIR) filter 274 (also referred to as a "transversal equalizer") filters the signal to a selected class of partial response filtering. A slicer 276 samples (digitizes) the signal and a Viterbi detector 278 recovers the data bit sequence therefrom. A decoder 280 removes RLL encoding from the sequence and performs other related functions to allow the data to be passed to the buffer 190 of the interface circuit 188 (FIG. 6) for further processing.

During operation in accordance with the embodiment of FIG. 10, a first set of adaptive parameters are utilized by the read channel 184 for the normal readback signal curve 242

(FIG. 8) to decode the user data transduced from the disc surfaces. Such adaptive parameters can be used to adjust gain levels of the AGC 270, filtering characteristics of the prefilter 272, tap weights used by the FIR 274, etc. and can be supplied, for example, by the system processor 198 (FIG. 6).

Additionally, when the above discussed on-the-fly write verification detection operations are desired, a second set of adaptive parameters can be readily loaded into the various circuits of FIG. 10 to enable recovery of the data content of the coupled readback signal curve 244 of FIG. 8. An advantage of this approach is that little or no additional circuitry may be required in the PRML read channel, provided that sufficient parametric adaptability and processing overhead are available to effect the switching between the two parameter sets.

It will now be appreciated that the claimed invention, as illustrated by the various embodiments presented above, facilitates improved data transfer rates by reducing the need for a subsequent read operation to verify written data. In summary, during a write operation a write current signal is generated (step 204) indicative of input data to be written to the disc. The write current signal is applied to a write element 132, which generates a time-varying magnetic field 136 to simultaneously induce a readback signal in a read element 134 through magnetic coupling of the read element to the write element, and to magnetize a disc 106 to write the input data to the disc (steps 206, 208). The readback signal induced in the read element is used to reconstruct a set of output data (step 210) which is used to verify accuracy of the input data (step 212). For purposes of the appended claims, the recited "means for writing a set of data to the disc and for simultaneously verifying accuracy of the set of data written to the disc without transducing the set of data from the disc" will be understood consistent with the foregoing discussion to correspond to the disclosed MR head 120 having separate write and read elements 132, 134 which are magnetically coupled to each other; the preamp 174 configured to simultaneously apply write currents to the write element and read bias current to the read element; a communication channel 180 with a read channel 184 and write channel 182; and interface circuit 188. It will be noted that prior art structures that perform write verification by subsequent reading from the media (disc) do not perform the recited function, and are further expressly excluded from the definition of an equivalent. Prior art structures that fail to have separate read and write elements in the head and instead use the same element to write and subsequently read data are incapable of performing the invention and are thus also expressly excluded from the definition of an equivalent.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive having a rotatable magnetic disc and a head having a read element and a write element, a method for writing data to the disc comprising steps of:

(a) generating a write current signal indicative of the data to be written to the disc;

(b) applying the write current signal to the write element to generate a time-varying magnetic field, wherein the magnetic field simultaneously induces a readback signal in the read element through magnetic coupling of the read element to the write element, and magnetizes the disc to write the data to the disc; and (c) using the simultaneously induced readback signal to verify accuracy of the data written to the disc.

2. The method of claim 1, further comprising steps of:

(d) subsequently transducing the data written to the disc during the applying step (b) to generate a second readback signal; and (e) using the second readback signal to verify accuracy of the data written to the disc.

3. The method of claim 1, wherein the using step (c) comprises steps of:

(c1) reconstructing a series of data symbols and associated code symbols from the readback signal; and (c2) using the code symbols to detect and correct erroneous data symbols.

4. The method of claim 1, wherein the data to be written to the disc are characterized as an input set of data, wherein the generating step (a) comprises passing the input set of data into a buffer, and wherein the using step (c) comprises steps of:

(c1) recovering an output set of data from the readback signal;

(c2) placing the output set of data in the buffer; and (c3) comparing the output set of data to the input set of data.

5. A method for verifying data written to a disc drive having a controllably positionable head adjacent a rotatable disc with a magnetic recording surface, the head having a write element which selectively magnetizes the recording surface to write data to the disc and a read element which transduces the selective magnetization of the recording surface to read data from the disc, the method comprising steps of:

(a) magnetically coupling the read and write elements so that passage of write currents through the write element generates a time-varying magnetic field which simultaneously induces a corresponding readback signal in the read element and selectively magnetizes the recording surface;

(b) writing data to the recording surface; and (c) verifying accuracy of the writing step (b) using a readback signal induced in the read element during the writing step (b).

6. The method of claim 5, further comprising steps of:

(d) subsequently transducing the data written to the disc during the writing step (b) to generate a second readback signal; and (e) using the second readback signal to verify the accuracy of the writing step (b).

7. A disc drive, comprising:

a rotatable disc having a magnetic recording surface;

a read/write head controllably positionable adjacent the recording surface and having a write element and a read element, the read element magnetically coupled to the write element;

a write driver which applies a series of write currents to the write element to write an input set of data to the disc, the write element generating a time-varying magnetic field in response to the write currents; and a read channel which recovers an output set of data from a readback signal simultaneously induced in the read element as the input set of data is written to the disc.

8. The disc drive of claim 7, wherein the disc drive uses the output set of data to verify accuracy of the first set of data.

9. The disc drive of claim 7, wherein the write element writes the input set of data to a selected data block of the disc, wherein the readback signal is characterized as a first readback signal and the output set of data is characterized as a first output set of data, and wherein the read channel subsequently recovers a second output set of data from a second readback signal obtained as the read element transduces the selective magnetization of the selected data block.

10. The disc drive of claim 7, wherein the read channel comprises a partial response, maximum likelihood data path for normal readback operations in parallel with a peak-detect data path used for on-the-fly write verification detection operations.

11. The disc drive of claim 7, wherein the read channel comprises a single partial response, maximum likelihood data path which switches between two different sets of channel parameters, with one set used during normal readback operations and the other set used during on-the-fly write verification detection operations.

12. A disc drive, comprising:

a rotatable disc; and means for writing a set of data to the disc and for simultaneously verifying accuracy of the set of data written to the disc without transducing the set of data from the disc.

* * * * *